United States Patent
Kaaret et al.

(10) Patent No.: US 8,148,312 B2
(45) Date of Patent: Apr. 3, 2012

(54) METHOD OF TREATING A SUBSTRATE WITH STABLE BLEACHES WITH COLORING AGENTS

(75) Inventors: Thomas W. Kaaret, Alamo, CA (US); Darin K. Griffith, Chattanooga, TN (US); Klein A. Rodrigues, Signal Mountain, TN (US); William L. Smith, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 13/237,817

(22) Filed: Sep. 20, 2011

(65) Prior Publication Data

US 2012/0009279 A1    Jan. 12, 2012

Related U.S. Application Data

(60) Division of application No. 12/013,576, filed on Jan. 14, 2008, now Pat. No. 8,048,837, which is a continuation-in-part of application No. 11/035,160, filed on Jan. 13, 2005, now Pat. No. 7,875,359.

(51) Int. Cl.
   *C11D 3/02* (2006.01)
   *C11D 3/37* (2006.01)
(52) U.S. Cl. ........ 510/191; 510/109; 510/405; 510/159; 510/218; 510/238; 510/242; 510/370; 510/419
(58) Field of Classification Search .................. 510/191, 510/109, 159, 218, 238, 242, 370, 405, 419; 428/461
   See application file for complete search history.

(56) References Cited

U.S. PATENT DOCUMENTS

| | | | |
|---|---|---|---|
| 3,661,827 A | | 5/1972 | Taft |
| 3,666,680 A | * | 5/1972 | Briggs ..................... 252/301.21 |
| 4,017,476 A | | 4/1977 | Murray et al. |
| 4,271,030 A | | 6/1981 | Brierley et al. |

(Continued)

FOREIGN PATENT DOCUMENTS

CA        998790        10/1976

(Continued)

OTHER PUBLICATIONS

Clemens et al, Nanocolorants—Pigments with Dyestuff Propeties, Polymer Preprints 41(1), pp. 24-25 (2000).

*Primary Examiner* — Michael M Bernshteyn
(74) *Attorney, Agent, or Firm* — Alok Goel; Stacy H. Combs

(57) ABSTRACT

The invention provides an aqueous bleaching solution for substrate treatment comprising a source of oxidant and a suspended polymer matrix having a plurality of optically functional particles associated with one or more copolymers present in the polymer matrix. The plurality of optically functional particles are associated with the copolymer during polymerization of at least one hydrophobic and at least one hydrophilic monomer so as to form a polymer matrix useful to impart an aqueous bleaching solution with optically functional properties providing a benefit to the solutions during storage, use and application to substrates for treatment. In accordance with various embodiments of the invention, the suspended polymer matrix forms a substantially stable dispersion of the optically functional particles in the aqueous bleaching solution, and provides compositions, methods and kits for employing aqueous bleaching solutions having optically functional properties that are maintained over substantially long storage times.

17 Claims, 5 Drawing Sheets

U.S. PATENT DOCUMENTS

| | | |
|---|---|---|
| 4,457,855 A | 7/1984 | Sudbury et al. |
| 4,474,677 A | 10/1984 | Foxlee |
| 4,486,237 A | 12/1984 | Paffoni et al. |
| 4,623,476 A | 11/1986 | Nayar et al. |
| 4,708,816 A | 11/1987 | Chang et al. |
| 4,714,562 A | 12/1987 | Roselle et al. |
| 4,917,814 A | 4/1990 | MacIntyre et al. |
| 4,931,207 A | 6/1990 | Cramer et al. |
| 4,952,333 A | 8/1990 | Cramer |
| 5,089,162 A | 2/1992 | Rapisarda et al. |
| 5,104,571 A | 4/1992 | Cramer |
| 5,106,421 A | 4/1992 | Marshall, Jr. et al. |
| 5,122,568 A | 6/1992 | DePierne et al. |
| 5,326,843 A | 7/1994 | Lorah et al. |
| 5,349,036 A | 9/1994 | Simpson et al. |
| 5,385,758 A | 1/1995 | Ahmed |
| 5,470,502 A | 11/1995 | Hahn et al. |
| 5,650,473 A | 7/1997 | Kimpton et al. |
| 5,688,435 A | 11/1997 | Chang et al. |
| 5,710,197 A | 1/1998 | Fischer et al. |
| 5,723,434 A | 3/1998 | Falk et al. |
| 5,789,571 A | 8/1998 | Beavers et al. |
| 5,795,379 A | 8/1998 | Schwenk et al. |
| 5,871,872 A | 2/1999 | Matijevic et al. |
| 5,886,076 A | 3/1999 | Kimpton et al. |
| 6,174,953 B1 | 1/2001 | Huybrechts |
| 6,228,824 B1 | 5/2001 | Gorlin |
| 6,258,764 B1 | 7/2001 | Gorlin |
| 6,337,359 B1 | 1/2002 | Diehl et al. |
| 6,420,328 B1 | 7/2002 | Gorlin |
| 6,444,747 B1 | 9/2002 | Chen et al. |
| 6,448,215 B1 | 9/2002 | Grande et al. |
| 6,503,877 B2 | 1/2003 | Grande et al. |
| 6,624,134 B1 | 9/2003 | Briatore et al. |
| 6,641,754 B2 | 11/2003 | Buentello et al. |
| 6,727,317 B2 | 4/2004 | Kurja et al. |
| 6,774,096 B1 | 8/2004 | Paye |
| 6,872,444 B2 | 3/2005 | McDonald et al. |
| 6,878,776 B1 | 4/2005 | Pascault et al. |
| 6,921,743 B2 | 7/2005 | Scheper et al. |
| 7,063,895 B2 * | 6/2006 | Rodrigues et al. ............. 428/461 |
| 2003/0072950 A1 * | 4/2003 | Rodrigues et al. ............. 428/437 |
| 2004/0156986 A1 | 8/2004 | Yadav |
| 2005/0075453 A1 | 4/2005 | Mathauer et al. |
| 2006/0055316 A1 | 3/2006 | Wu et al. |

FOREIGN PATENT DOCUMENTS

| | | |
|---|---|---|
| GB | 2065673 | 7/1981 |
| JP | 57044700 | 3/1982 |
| JP | 60228510 | 11/1985 |
| JP | 5132648 | 11/1991 |
| WO | WO 99/40123 A2 | 8/1999 |
| WO | WO 00/50554 A1 | 8/2000 |

* cited by examiner

Stability of Pigment 4920

Stability of Pigment 4919

METHOD OF TREATING A SUBSTRATE WITH STABLE BLEACHES WITH COLORING AGENTS

REFERENCE TO RELATED APPLICATIONS

This application is a divisional of U.S. patent application Ser. No. 12/013,576 now U.S. Pat. No. 8,048,837, which is a continuation-in-part application of U.S. patent application Ser. No. 11/035,160, filed on Jan. 13, 2005, now U.S. Pat. No. 7,875,359, which are hereby incorporated by reference in their entirety.

FIELD OF THE INVENTION

The invention relates generally to the field of substrate treating, and more specifically, to aqueous bleaching solutions having a suspended polymer matrix with optically functional particles for providing functional benefits to the bleaching solutions and treated substrates. The invention also relates to methods and kits for providing suspensions of optically functional particles within suspended polymer matrices having prolonged stability in aqueous bleaching solutions with improved functional benefits.

BACKGROUND OF THE INVENTION

Bleaches are used for various purposes such as deodorization, stain removal, brightening, whitening, disinfection, sanitizing, sterilizing, and the like. Bleaches are used to treat various substrates, including hard or non-porous surfaces, soft or porous surfaces and materials such as fabrics, textiles and clothing, by various means including wetting, wiping, spraying or immersion in bleaching solutions or their aqueous diluted forms, for example. Aqueous bleach solutions based on oxidants such as a hypohalous acid or peroxide are commonly employed for this purpose. For best results, the bleach solutions are employed soon after preparation when oxidant levels are at their highest level in order to achieve optimum bleaching action for the purpose desired. Commonly, however, bleach solutions are stored for prolonged periods between uses, and under conditions that may result in a loss of oxidizing strength that can reduce performance significantly over time. Storage factors such as time, temperature, packaging and exposure to light can decrease the stability of aqueous bleaches. In addition, other materials present, such as dyes, thickeners, polymers, dispersing agents and the like can also act to decrease the stability of aqueous bleaches and themselves be subject to the oxidative action of the bleach, resulting in substantially reduced performance and poor product characteristics.

One approach in the art to minimize performance loss is to incorporate materials in the form of solids in particle form to reduce interaction with the oxidant. Generally, such particles are limited to chemically stable materials that are themselves bleach resistant or have minimal effect on the oxidant stability. However, additional stabilizing and/or dispersing agents are required to overcome the otherwise inevitable physical instability that results from settling, aggregation and/or precipitation of such particles over time. Typically, dispersing and stabilizing agents act to suspend the particles against aggregation and settling, and achieve this by means of thickening, viscosity modification or network formation that tend to alter the rheology of the bleaching solutions. Thickened bleaches and bleaching gels are common examples of the resulting rheologies required when particulate coloring agents are used. The changed rheologies of the bleaching solutions results in changes to the processing, handling, pouring and dispensing characteristics, which limits their utility in certain applications, such as in spraying and dosing applications. Further, the additional materials added can negatively impact stability and add cost to the bleaching solutions.

In light of the foregoing discussion, there is a need for stable aqueous bleaching solutions having optically functional particles for providing functional benefits to the bleaching solution and substrates treated with the bleaching solution, where stable The aqueous bleaching solution should provide means enabling a stable suspension of the optical functional particles, and needs to be resistant to chemical degradation in the presence of an oxidant. Further, the aqueous bleaching solution should be stable without the requirement of using thickening agents, flocculants and/or dispersing agents and the like.

SUMMARY OF THE INVENTION

The present invention relates to stable aqueous bleaching solutions with optically functional particles that provide a functional benefit to the bleaching solutions and substrates treated with the solutions.

The present invention relates to aqueous bleaching solutions with optically functional particles stabilized without the requirement of using thickening agents, flocculants and dispersing agents to provide for a uniform and homogeneous bleach solution containing optically functional particles with long storage and shelf-life properties.

The present invention further relates to compositions that provide a stable aqueous bleaching solution with optically functional particles stabilized within a suspended polymer matrix that provides a stable, uniform and homogeneous bleach solution with extended storage stability for use in treating articles and substrates.

The present invention further relates to a method of treating a substrate comprising the steps of first contacting a substrate with an aqueous bleaching solution comprising a source of oxidant and a suspended polymer matrix comprising one or more copolymers and a plurality of optically functional particles, wherein the plurality of optically functional particles are associated with the one or more copolymers and the suspended polymer matrix forms a substantially stable dispersion in the aqueous solution; then secondly removing the aqueous bleaching solution from the substrate, and; then thirdly or optionally rinsing the substrate with water.

The present invention also relates to a kit for substrate cleaning comprising an aqueous bleaching solution for substrate treatment comprising a source of oxidant and a suspended polymer matrix comprising one or more copolymers and a plurality of optically functional particles, wherein the plurality of optically functional particles are associated with one or more copolymers; a packaging material for the aqueous solution; and user instructions, wherein said suspended polymer matrix provides an optical stability to said aqueous bleaching solution exhibiting less than 20 delta E units change after storage at 120° F. for 480 hours.

In accordance with the above objects and those that will be mentioned and will become apparent below, one object of the invention embodiment of the invention provides an aqueous bleaching solution for substrate treatment containing a plurality of optically functional particles associated with a suspended polymer matrix and a source of oxidant. The suspended polymer matrix comprises one or more copolymers and a plurality of optically functional particles that are associated with the copolymer. The suspended polymer matrix forms a substantially stable dispersion in the aqueous bleaching solution thereby providing improved functional benefits to the solution and substrates treated therewith owing to the presence of the optically functional particles associated with the copolymer.

The present invention also discloses a process for encapsulating or creating microparticulates in the form of a suspended polymer matrix of one or more copolymers containing a water insoluble active in the form of a plurality of optically functional particles. This process involves polymerizing at least one hydrophobic monomer and at least one water-soluble acid-containing monomer in the presence of water, one or more water-miscible solvents and one or more neutralizing agents and the water insoluble active. The water insoluble active can be dissolved in a mixture of water, one or more water miscible solvents and one or more neutralizing agents. The monomers are then added to the system, with polymerization occurring in the presence of the water-insoluble active. Alternatively, the monomers can be polymerized and the water-insoluble active added at the end of the polymerization process. Particles or microparticulates of the copolymer are formed during the latter stages of the polymerization process or when the water miscible solvent is distilled or stripped off. The water insoluble active ingredient is then incorporated into these copolymer particles or copolymer microparticulates in the form of a plurality of optically functional particles associated with the one or more copolymers resulting from the polymerization process. Owing to the incorporation of at least one water-soluble acid-containing monomer in the copolymer, copolymer particles or microparticulates are formed that are suspendable in water in the form of a suspended polymer matrix that will maintain a substantially stable dispersion in the aqueous bleaching solution of the present invention.

In one embodiment, the suspended polymer matrix can be in the form of a copolymer forming a coating around a plurality of optically functional particles such that the copolymer coating is insoluble due to ionic strength, high surfactant concentration, and/or the high pH of the aqueous bleaching solution. In this preceding embodiment, either dilution of a first aqueous bleaching solution in water or some other means whereby the ionic strength, surfactant concentration and/or high pH of a second aqueous bleaching solution resulting from dilution of the first solution is reduced sufficiently compared to said first solution so as to render the copolymer coating partially or fully soluble in the resulting second solution such that the associated plurality of optically functional particles formerly associated with the suspended polymer matrix are released from their association with the copolymer.

In another embodiment, the copolymer(s) can be selected so that the resulting suspended polymer matrix will remain substantially unaffected with regard to changes in one or more selected physical and/or chemical solution properties including, but not limited to, changes in ionic strength, temperature, concentration of copolymer, surfactant concentration and/or pH of either a first aqueous bleaching solution or a resulting second diluted aqueous bleaching solution such that the plurality of optically functional nanoparticles remain associated with the one or more copolymers and are not released from their association with the copolymer.

Suitable hydrophobic monomers and suitable water-soluble acid-containing monomers, as well as suitable water-miscible solvents and neutralizing agents that may be used to form the inventive suspended polymer matrix comprising one or more copolymers with which a plurality of optically functional particles may be associated are disclosed in co-pending U.S. patent application Ser. No. 11/035,160.

Suitable hydrophobic monomers include those that are at least partially resistant against oxidation in an aqueous bleaching solution, and include for example, but not are limited to styrene, α-methyl styrene, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene. Combinations of one or more hydrophobic monomers can also be used.

Suitable polymerizable acid-containing monomers include those that are at least partially resistant against oxidation in an aqueous bleaching solution, and include for example, but are not limited to acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, vinyl phosphonic acid, sodium methallyl sulfonate, sulfonated styrene, allyloxybenzene sulfonic acid, maleic acid, and maleic anhydride. Combinations of acid-containing hydrophilic monomers can also be used. In one embodiment, the acid-containing hydrophilic monomer constituent is selected from acrylic acid, methacrylic acid, maleic acid, itaconic acid and mixtures thereof. In another embodiment, combinations of one or more acid-containing monomers can also be used.

In one embodiment, a suspended polymer matrix formed from one or more copolymers is obtained in the form of stable dispersion in an aqueous solution following a process step in which the water miscible solvent is distilled or stripped off from the aqueous solution, resulting in a plurality of optically functional particles associated with the one or more copolymers in the form of a substantially stable dispersion that can then be introduced to, diluted by, and/or combined in any suitable manner with a source of oxidant to form the inventive aqueous bleaching solution for use in substrate treatment.

Further features and advantages of the present invention will become apparent to those with ordinary skill in the art, in view of the detailed description of the collective embodiments below, when considered together with the attached claims.

DETAILED DESCRIPTION

Figure 1:
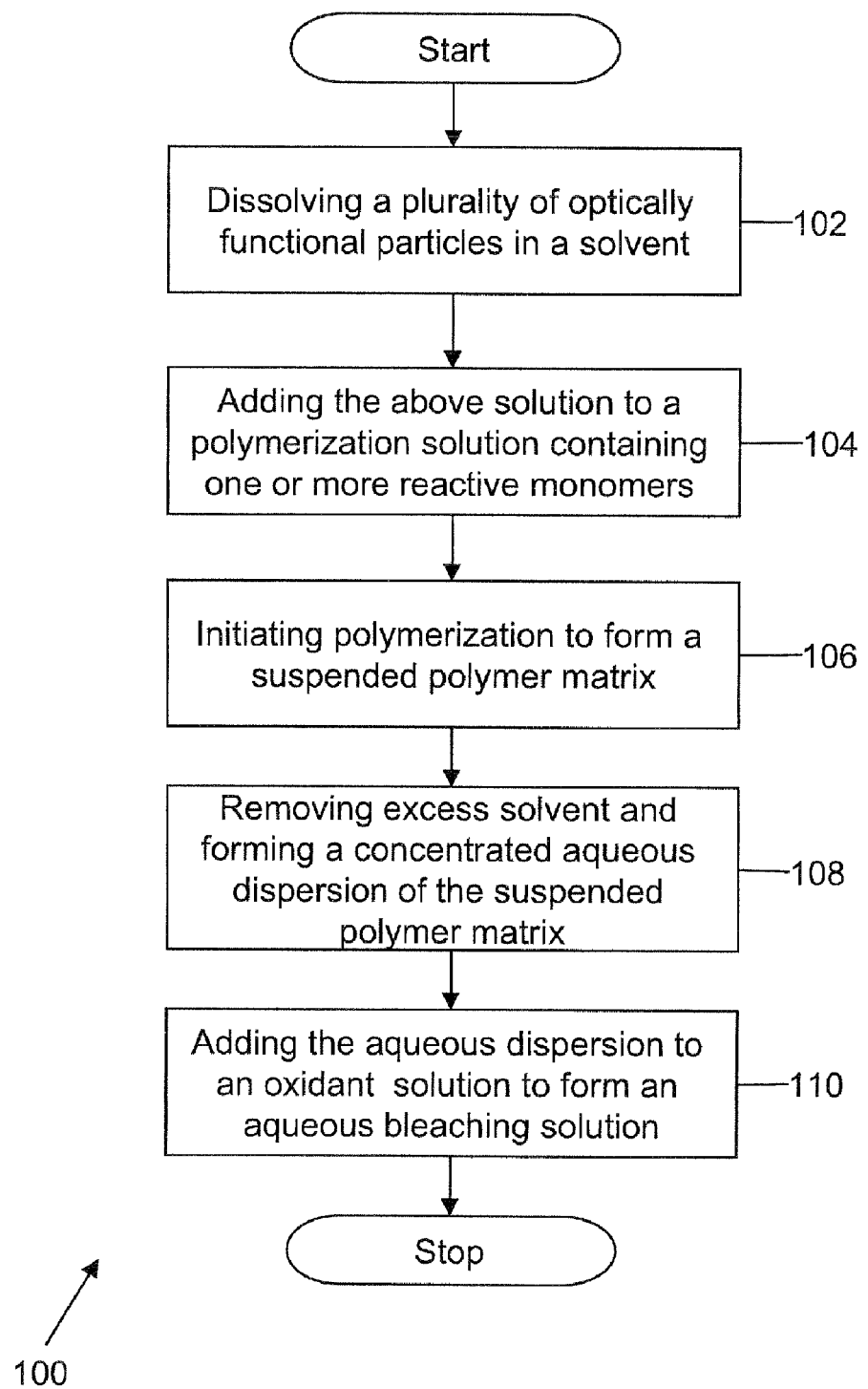
FIG. 1 is a flowchart depicting a method for preparing the suspended polymer matrix and the aqueous bleaching solution.

Before describing the present invention in detail, it is to be understood that this invention is not limited to particularly exemplified systems, compositions or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "solution" may include two or more such solutions.

Unless defined otherwise, all technical and scientific terms used herein have the same meaning as commonly understood by one with ordinary skill in the art to which the invention pertains. Although a number of methods and materials, similar or equivalent to those described herein, can be used in the practice of the present invention, some of the preferred materials and methods are described herein.

In the present application, effective amounts are generally those amounts listed as the ranges or levels of ingredients in the descriptions, which follow hereto. Unless otherwise stated, amounts listed in percentage ("% or percent") are in weight percent (based on 100% active) of the total composition.

It may be noted that the term "bleaching", as used in this document, may also refer to processes like "oxidation", "decolorization," "cleaning", "whitening", "brightening", and the like. All these terms have also been used somewhat interchangeably to denote overall improved cleanliness and whiteness of, for example, a washed fabric. The term "hypohalite" has been used to describe both a hypohalite and a hypohalite generator, unless otherwise indicated. The term "bleach," as used in this document, generally refers to a reactive oxygen or halogen containing or releasing material that is capable of oxidation of a material in aqueous solution, and/or a material present on a substrate that is contacted with an aqueous composition containing the bleach.

Various embodiments of the invention provide an aqueous solution for bleaching purposes. The aqueous solution is hereinafter referred to as an aqueous bleaching solution. The aqueous bleaching solution includes at least a source of oxidant and a suspended polymer matrix. The source of oxidant provides the bleaching and cleaning of surfaces. The suspended polymer matrix provides stability to the aqueous bleaching solution and enables stable coloring of the aqueous bleaching solution.

In accordance with various embodiments of the invention, the source of oxidant may include, for example, a suitable oxidizing agent, a bleaching component, and the like. Any oxidizing agent and bleaching component known to those skilled in the art may be suitable for being used herein. The source of oxidant acts as a bleach and provides the ability to remove colored and organic stains and produce a whitening effect on fibers. The source of oxidant also acts to destroy malodorous molecules, further kill or reduce the levels of germs, bacteria, viruses and other microorganisms during use.

In accordance with an embodiment of the invention, the source of oxidant may include a halogen-based oxidant. In particular, the source of oxidant may include a hypohalite-producing species, for example, alkali metal and alkaline earth salts of hypohalites, haloamines, haloimines, haloimides, haloamides, and the like. Hypohalites display high activity at low-concentration levels and are normally aggressive to actives and adjuncts that are susceptible to the bleaching effects of the source of oxidant. Hypohalites provide good stain and soil removal, whitening, brightening, allergen control, chemical decontamination, sanitization, sterilization, and are broad-spectrum antimicrobial agents. In accordance with an embodiment of the invention, the hypohalites may be at least partially water-soluble and may generate an active halogen ion, such as for example the hypochlorous anion '$OCl^-$' on dissolution in water.

In particular, the source of oxidant is a hypochlorite or a generator of hypochlorite in the aqueous bleaching solution, although a hypobromite or a hypobromite generator, or a hypoiodite or a hypoiodite generator, or a combination thereof, is also suitable. Examples of hypochlorite generators may include, but are not limited to sodium hypochlorite, potassium hypochlorite, lithium hypochlorite, magnesium hypochlorite, calcium hypochlorite, chlorinated trisodium phosphate dodecahydrate, potassium and sodium dichloroisocyanurate, trichlorocyanuric acid, and the like.

In accordance with yet another embodiment of the invention, the source of oxidant may be an alkali metal hypochlorite, an alkaline earth salt of hypochlorite, or a mixture thereof. A particularly effective source of oxidant that may be employed in the invention is sodium hypochlorite, with the chemical formula $NaOCl$. In another embodiment of the invention, the pH of the aqueous bleaching solution may be adjusted to a more acidic value below pH 12 so as to increase the amount of a hypohalous species present in the solution in equilibrium with the hypohalite. Accordingly, in one embodiment, the pH of a sodium hypochlorite solution may be adjusted to below pH 10 to produce a greater equilibrium proportion and hence increase the relative concentration of hypochlorous acid present in the aqueous bleaching solutions of the present invention. Suitable embodiments include aqueous bleaching solutions having pH values ranging from about pH 6 to above pH 12, depending on the intended application and use.

In accordance with an embodiment of the invention, the hypohalite-generating compounds mentioned above may be employed in solid, powdered, granular, paste and tablet forms, due to their stability in essential dry form and their good mechanical processability. Further, the hypohalite may be formed by using methods well known to those skilled in the art.

In accordance with an embodiment of the invention, organic bleach sources may also be used as the source of oxidant. Non-limiting examples of the organic bleach sources that are suitable for use may include heterocyclic N-bromo- and N-chloro-imides such as trichlorocyanuric and tribromocyanuric acid, dibromocyanuric acid and dichlorocyanuric acid, and potassium and sodium salts thereof, N-brominated and N-chlorinated succinimide, malonimide, and phthalimide and naphthalimide. Further, hydantoins such as dibromodimethyl-hydantoin and dichlorodimethyl-hydantoin, chlorodimethyl-hydantoin, N-chlorosulfamide (haloamide) and chloramine (haloamine) may also be used as the source of oxidant.

In accordance with yet another embodiment of the invention, the source of oxidant may be oxygen-based. Examples of the oxygen-based source of oxidant may include a peroxygen, a peroxyhydrate, an active oxygen-generating compound, and the like. In particular, suitable peroxygen bleaches may include hydrogen peroxide or sources thereof. It may be noted that a source of hydrogen peroxide refers to any compound that generates active oxygen when the compound is in contact with water. Examples of suitable water-soluble sources of hydrogen peroxide, for use herein, may include percarbonates, preformed percarboxylic acids, persilicates, persulphates, perborates, organic and inorganic peroxides, hydroperoxides, and the like In addition, other classes of peroxides may also be used as an alternative to hydrogen peroxide and sources thereof, or in combination with hydrogen peroxide and sources thereof. Examples of such classes of peroxides include dialkylperoxides, diacylperoxide, performed percarboxylic acids, organic and inorganic peroxides, hydroperoxides, and the like. Suitable organic peroxides hydroperoxides may include diacyl and dialkyl peroxides/hydroperoxides such as dibenzoyl peroxide, t-butyl hydroperoxide, dilauroyl peroxide, dicumyl peroxide, and mixtures thereof. According to the invention, suitable preformed peroxyacids may also include diperoxydodecandioic acid (DPDA), magnesium perphthalic acid, perlauric acid, perbenzoic acid, diperoxyazelaic acid, and mixtures thereof.

In accordance with an embodiment of the invention, one or more bleach activators, or mixtures thereof, may be used in conjunction with a peroxygen oxidant. Herein, the term bleach activators refer to compounds that react with a peroxygen oxidant such as hydrogen peroxide to form a peracid. The peracid thus formed constitutes an activated source of oxidant. The bleach activators may include compounds belonging to the class of esters, amides, imides, anhydrides, and the like. Examples of suitable bleach activators are disclosed in British Patent No.s GB 1,586,769 and GB 2,143,231, and a method for their formation into a prilled form is described in European Published Patent Application EP-A-62,523, all of which are incorporated herein by reference. Examples of these bleach activators may include, but are not limited to, tetra acetyl ethylene diamine (TAED), sodium 3,5,5 trimethyl hexanoyloxybenzene sulphonate, diperoxy dodecanoic acid, as described, for example, in U.S. Pat. No. 4,818,425, nonylamide of peroxyadipic acid, as described, for example, in U.S. Pat. No. 4,259,201, and n-nonanoyl oxybenzene sulphonate (NOBS), the cited patents being incorporated herein by reference. N-acyl caprolactams are also suitable and include substituted or unsubstituted benzoyl caprolactam, octanoyl caprolactam, nonanoyl caprolactam, hexanoyl caprolactam, decanoyl caprolactam, undecenoyl caprolactam, formyl caprolactam, acetyl caprolactam, propanoyl caprolactam, butanoyl caprolactam pentanoyl caprolactam, or mixtures thereof. A particular family of bleach activators has been disclosed in EP 624,154, incorporated herein by reference, and the bleach activator specifically preferred in that family is acetyl triethyl citrate (ATC). Acetyl triethyl citrate has the advantage that it is environmental-friendly since it eventually degrades into citric acid and alcohol. Further, acetyl triethyl citrate demonstrates substantially high hydrolytic stability during storage and is an efficient bleach activator. Another particular family of bleach activators has been disclosed in U.S. Pat. Nos. 5,741,437, 6,010,994 and 6,046,150, all of which are incorporated herein by reference, such family generally described as n-alkyl alkyl ammonium acetonitrile activators. The bleach activator particularly preferred in that family is n-methyl morpholinium acetonitrile (MMA). In accordance with various embodiments of the invention, other sources of oxidant may also include one or more bleach activators.

In accordance with various embodiments of the invention, persulfate salts, or mixtures thereof, may also be used as the source of oxidant. These persulfate salts provide active oxygen that my also be used. In accordance with an embodiment of the invention, a persulfate salt may be used in the form of monopersulfate triple salt, for example, potassium monopersulfate, which is commercialized by Peroxide Chemie GMBH under the trade name Curox®, by Degussa under the trade name Caroat®, and by Du Pont under the trade name Oxone®.

In accordance with an embodiment of the invention, the concentration of the source of oxidant, such as sodium hypochlorite, in the aqueous bleaching solution may be in the range of about 0.0001 percent (1 ppm) to 20 percent by weight. For example, for use in laundry purposes, the concentration of sodium hypochlorite the aqueous bleaching solution may lie in the range of about 2 percent to about 7 percent, for use in cleaning hard surfaces the concentration of sodium hypochlorite may lie in the range of about 0.0001 to about 5 percent, and for use in automatic dishwashing detergents, the concentration of sodium hypochlorite may lie in the range of about 0.1 percent to about 2 percent, depending on the particular application at hand.

In accordance with an embodiment of the invention, the suspended polymer matrix includes one or more copolymers and a plurality of optically functional particles. The suspended polymer matrix may include one or more non-optically functional particles. The optically functional particles, and any non-optically functional particles present, are associated with the copolymers. In particular, the optically functional particles may be physically trapped with or encapsulated within the polymer matrix, or may be associated with the copolymer or the polymer matrix through, for example, associative and/or chemical bonding interactions well known in the art. The co-association of the optically functional particles with the copolymer or the polymer matrix contributes to the stability of the optically functional particles in the aqueous bleaching solution. In accordance with an embodiment of the invention, the suspended polymer matrix provides a stable aqueous bleaching solution by enabling the formation of a substantially stable dispersion of a plurality of optically functional particles associated with the copolymer in the aqueous bleaching solution.

In accordance with an embodiment of the invention, the aqueous bleaching solution may have substantially low viscosity. In one embodiment, the viscosity of the aqueous bleaching solution measured before and after the addition of the suspended polymer matrix is less than 10 milliPascal seconds (mPa·s) at 20° C. In another embodiment, the viscosity of a 1 weight % aqueous bleaching solution of sodium hypochlorite having present about 1 weight % of a suspended polymer matrix containing a plurality of optically functional particles present at a copolymer-to-particle weight ratio of 50:1 is less than 5 milliPascal seconds, exhibiting similar viscosity and rheological properties as that of the same bleach composition absent the suspended polymer matrix, exhibiting essentially a viscosity just above 1 mPa·s at 20° C.

In accordance with one embodiment of the invention, the optically functional particles provide stable coloration to the aqueous bleaching solution. This includes providing the desired color to the aqueous bleaching solution, which is stable and does not fade away with time due to, for example, chemical degradation, settling of the optically functional particles, aggregation causing inhomogeneity and changes in appearance or hue, and the like.

In accordance with another embodiment of the invention, the polymer matrix and optically functional particles provide uniform optically functional properties to the aqueous bleaching solution. Optically functional benefits provided to the aqueous bleaching solution include uniform light absorption, light and radiation scattering, fluorescent emission, phosphorescent emission, coloration, and the like. Further optically functional benefits include those provided to a substrate or surface treated with the aqueous bleaching solutions of the present invention whereby the optically functional property is transferred either temporarily or permanently to the substrate or surface following contact with the bleaching solutions.

In accordance with an embodiment of the invention, the optically functional particles may include particles of optically functional materials such as pigments, dyes, bleach-stable dyes, light absorbing materials, light scattering materials, fluorescent materials, phosphorescent materials, minerals and synthetic layered semiconductor particles, core-shell particles, encapsulated colorants, nanoparticulate materials, and combinations thereof. In accordance with an embodiment of the invention, the optically functional particles may be reasonably stable to oxidation. In particular, the optically functional particles may be stable to oxidation by halogen bleaches. In accordance with one particular embodiment of the invention, the optically functional particles may include anthroquinone derivatives.

Further, the optically functional particles may include a light absorbing material and/or a light scattering material. The light absorbing material may absorb radiations like visible and ultraviolet light and reduce, for example, the chemical degradation of the source of oxidant and additional additives in the aqueous bleaching solution by these radiations. The optically functional particles may also include a light reflecting material to, for example, prevent the chemical degradation of the source of oxidant and additional additives in the aqueous bleaching solution by preventing the penetration of radiant energy into the aqueous bleaching solutions of the instant invention. The light reflecting material may reflect the radiation such as visible, ultraviolet and infrared radiations and prevent the degradation otherwise caused by these radiations. The optically functional particles may also include, for example, fluorescent agents, phosphorescent agents, whitening agents, brightening agents, and the like. These optically functional particles may render properties such as luminescence, whitening, brightening, and the like, to the aqueous bleaching solution and the treated substrates. In accordance with an embodiment of the invention, a combination of one or more of the aforementioned types of optically functional particles may be used in the aqueous bleaching solution.

In accordance with an embodiment of the invention, the optically functional particles may include visibly colored particles exhibiting at least one optical absorbance band, which provides a human perceivable color to the suspended polymer matrix in solution that lies within the visible spectrum.

Further, the optically functional particles may be of a predetermined particle size. In accordance with an embodiment of the invention, the particle size may be in the range of 5 nanometers and 100 microns. In particular, the particle size may be in the range of 5 nanometers and 50 microns. Alternatively, the particle size may be in the range of 5 nanometers and 10 microns. In another embodiment of the invention, the process of solvent extraction may be adjusted in situ to produce the desired particle size or range of desired particles sizes of the resulting particles formed during extraction in the presence of the polymer matrix, by modification of the solvent, the extraction parameters, extraction process, extraction time, and other any other processing factors that effect an influence on the resulting particles sizes produced during formation of the polymer matrix. In accordance with an embodiment of the invention, the optically functional material may be fully solubilized in the solvent employed for polymerization of the copolymer during formation of the polymer matrix so that the optically functional material is effectively dissolved to form a homogeneous solution. In an alternative embodiment, a solvent or solvent mixture may be employed that effects only partial solubilization of the optically functional materials so that the optically functional material is effectively suspended in the solution in the form of a homogeneous suspension of fine particles. In accordance with an embodiment of the invention, the particle number and/or the particle size may be independently selected to, for example, produce a desirable initial E value in the aqueous solutions at a desired level of suspended polymer matrix. In accordance with another embodiment of the invention, the particle size may be selected to, for example, affect a delta E of less than 10. Herein, delta E provides a measurement of the difference in color of the aqueous bleaching solution with time.

In accordance with an embodiment of the invention, the optically functional particles may be formed by trapping a non-aqueous solution of dissolved optically functional materials within the copolymer during formation of the suspended polymer matrix. In another embodiment of the invention, optional non-optically functional materials and/or non-optically functional particles may be included during formation of the polymer matrix, and/or alternatively included in the aqueous bleaching compositions in combination with suspended polymer matrixes having incorporated optically functional particles present.

In accordance with an embodiment of the invention, the aqueous bleaching solution may include more than one type of the optically functional particles mentioned above. Further, the effective concentration of the optically functional particles in the aqueous bleaching solution may be in the range of about 0.001 percent to about 10 percent by weight, with respect to the amount of the optically functional particle component present in the suspended polymer matrix with which the plurality of particles are associated. In particular, the concentration may be about 0.01 percent to about 5 percent. Preferably, the concentration may be about 0.05 percent to about 2 percent. The concentration may also be expressed in terms of the weight percent of the suspended polymer matrix with respect to the aqueous bleaching composition, where the copolymer-to-particle weight ratio is known or may be preselected prior to formation of the polymer matrix.

In accordance with an embodiment of the invention, the particles associated with the inventive polymer matrix includes at least one optically functional particle and may optionally further include at least one non-optically functional particle.

In accordance with an embodiment of the invention, the aqueous bleaching solution may also include one or more cleaning actives to effect a desired performance. Examples of these cleaning actives may include surface-active agents, anti corrosion agents, one or more pacifying agents, and the like. The cleaning actives may also include surfactants, builders, pH control agents, pH-buffering components, chelants, sequestrants, stabilizing agents, brighteners, fillers, binding agents, anti-dusting agents, dispersing agents, co-surfactants, and aesthetic adjuncts such as fragrances, coloring agents, dyes, whiteners, solvents and chelating agents, which contribute to the aesthetic appeal and provide additional functionalities to the aqueous bleaching solution.

In accordance with an embodiment of the invention, one or more fluorescent whitening agents may be present in the aqueous bleaching solution, in addition to the oxidant solution and the suspended polymer matrix. These fluorescent whitening agents may be introduced during the preparation of the suspended polymer matrix. The fluorescent whitening agents may also be introduced directly into the aqueous bleaching solution during the addition of the suspended matrix solution. In accordance with another embodiment of the invention, the fluorescent whitening agents are introduced into an aqueous wash liquor by adding a laundry detergent that contains the fluorescent whitening agent, and either simultaneously or subsequently, the aqueous bleaching solution is introduced to the wash liquor to provide an increased textile bleaching performance.

Fluorescent whitening agents may also be selected from the stilbenic type: 4,4'-bis anilino-6-[bis(hydroxyethylmethyl) amino]-s-triazin-2-yl amino 2,2'-stilbenedisulfonic acid, available as Tinopal® 5BM-GX from Ciba-Geigy; 4,4'-bis anilino-6 [bis(2,2-hydroxyethyl) amino]-2-triazin-2,2-yl amino-2,2' stilbene disulfonic acid, available as Tinopal® UNPA-GX from Ciba-Geigy, cyanuric chloride/diaminostilbene types such as Tinopal AMS, DMS, 5BM, and UNPA from Ciba-Geigy Corp. and Blankophor DML from Mobay; and the distyrylbiphenyl types, for example, 2,2'-biphenyl-4,4'-diyl-di-2,1-ethenediyl benzenesulfonic acid and disodium salt, available as Tinopal® CBS-X from Ciba-Geigy.

In accordance with an embodiment of the invention, the aqueous bleaching solution may also include commercially available optical brighteners. Examples of the optical brighteners may include but are not limited to distyrylbiphenyl (DSBP) optical brighteners, which can be mono- or polysulfonated, triazinyl stilbene optical brighteners that can be mono- or polysulfonated, triazolylstilbenes optical brighteners, which can be mono- or polysulfonated, naplithotriazolyl stilbenes optical brighteners that can be mono- or polysulfonated, diarylpyrazolines and coumarins, as described in U.S. Patent. No. Application number 2003/0126689, which is hereby incorporated by reference.

In accordance with an embodiment of the invention, the aqueous bleaching solution may optionally include an alkalinity source. The alkalinity source may be used to increase the effectiveness of the surfactant and the overall cleaning efficiency of the aqueous bleaching solution. The alkalinity source may be a builder, a buffer, a pH-adjusting agent, and the like. The alkalinity source may also function as a water softener and a sequestering agent in the aqueous bleaching solution. The builder, buffer and pH-adjusting agents may also be used alone, in mixtures, in combination with or in the form of their appropriate conjugate acids or conjugate bases, to adjust and control the pH of the aqueous bleaching solution. In accordance with an embodiment of the invention, the pH may be above about 11 for aqueous bleaching solution containing sodium hypochlorite as the source of oxidant. In particular, the pH may be above about 12.

In accordance with an embodiment of the invention, the aqueous bleaching solution with sodium hypochlorite as the source of oxidant may include at least an equimolar concentration of sodium chloride. Further, sodium carbonate, sodium hydroxide and other salts and/or buffering agents may also be included in the aqueous bleaching solution. Inorganic salts such as sodium sulfate and sodium borate may also be present. Moreover, sodium silicates may be used to stabilize the pH and reducing the corrosion effect of the aqueous bleaching solution.

In accordance with an embodiment of the invention, the aqueous bleaching solution may be included in a product kit, which may include instructions for using the aqueous bleaching solution. In particular, the kit may include instructions for preparing an aqueous wash liquor by using the aqueous bleaching solution. The kit may also include packaging material containing the inventive aqueous bleaching solution. In one embodiment, the packaging material is partially or fully transparent or translucent with respect to an external radiation source, and encompasses the inventive aqueous bleaching solutions, which owing to the properties of the optically functional particles associated with the suspended polymer matrix of the present invention, renders the resulting aqueous bleach solutions compatible for storage in the partially or fully transparent or translucent packaging material in the presence of radiative flux to provide optical stability to the aqueous bleach solutions. In an embodiment of the present invention, the kit provides a packaging means for displaying the inventive aqueous bleach solutions in an environment where they are potentially exposed to an external radiation source, but are provided with optical stability such that the aqueous solution of the kit exhibits a delta E value of no more that about 20 units after storage for a preselected time period.

Suspended Polymer Matrix Composition

Copolymers suitable for use in the suspended polymer matrix compositions of the present invention, and methods for preparing such copolymers are described in U.S. Patent Publication No. 2006/0154088A1, which is hereby incorporated herein in entirety.

In one embodiment, the copolymer is formed using one or more hydrophobic monomers with a polymerizable ethylene group. In one particular embodiment, the hydrophobic monomer may include a styrene monomer and/or styrene derivatives, having an alkylene moiety such as for example an ethylene or propylene moiety. In another embodiment, the copolymer also is formed using one or more hydrophilic monomers having a polymerizable ethylene group and including one or more carboxylate groups. Suitable examples of hydrophilic monomers include monomers of acrylate, methacrylate, or maleic acid salts. The counter ion for the carboxylate groups can be any cation which does not render the monomer insoluble in water. Suitable counter ions include sodium, potassium, ammonium, and the like. In one embodiment, the mole fraction of the carboxylate containing monomer is at least 10 and no more than 90%. In yet another embodiment, the mole fraction ranges from between 30 and 70%. Without being bound by theory, it is believed that the only requirement for selection of the relative amounts of hydrophobic and hydrophilic monomer present in the copolymer is that there be sufficient carboxylate groups present to provide a stable suspension of the polymer matrix without a requiring a stabilizing additive to be present; and also that there be sufficient hydrophobic monomer present to incorporate the optically functional particles into the suspended polymer matrix. In one embodiment, the monomers are randomly polymerized in the presence of a solubilized optically functional material dissolved in an organic solvent. The weight ratio of the copolymer to the resulting optically functional particle may be 1000:1 to 10:1. Generally, the amount of optically functional material present in the form of an optically functional particle associated with the suspended polymer matrix is sufficient to provide at least one functional benefit to the aqueous bleaching solution owing to the optical properties of the optically functional material employed.

FIG. 1 is a flowchart depicting a method for preparing the suspended polymer matrix and the aqueous bleaching solution. At step 102, a plurality of optically functional particles are dissolved in a solvent to form a solution. Examples of these optically functional particles may include dyes, pigments, and the like. In accordance with an embodiment of the invention, the optically functional particles may include particles of one or more optically functional materials. At step 104, the solution mentioned above is added to a polymerization solution containing one or more reactive monomers.

At step 106, polymerization is initiated to form a suspended polymer matrix. In accordance with an embodiment of the invention, the suspended polymer matrix includes the optical functional particles that are associated with the copolymer of the polymer matrix. The optically functional particles may also be physically trapped inside the copolymer. At step 108, excess solvent is removed from the suspended polymer matrix and a concentrated aqueous dispersion of the suspended polymer matrix is formed. At step 110, the aqueous dispersion of the suspended polymer matrix is added to an aqueous solution of a source of oxidant to form an aqueous bleaching solution.

Methods of Use

Methods of use of the present invention include all such means whereby an aqueous bleaching solution may be prepared, stored, and used to provide an improved bleaching benefit and/or enhanced performance derived from the plurality of optically functional particles present and associated with the one or more copolymers in the form of a suspended polymer matrix.

The aqueous bleaching solution formed by the method mentioned above is generally homogeneous in appearance and stable against physical and/or chemical degradation of the optically functional particles as well as other materials optionally in the compositions containing the suspended polymer matrix for a substantially long period of time.

Figure 2:
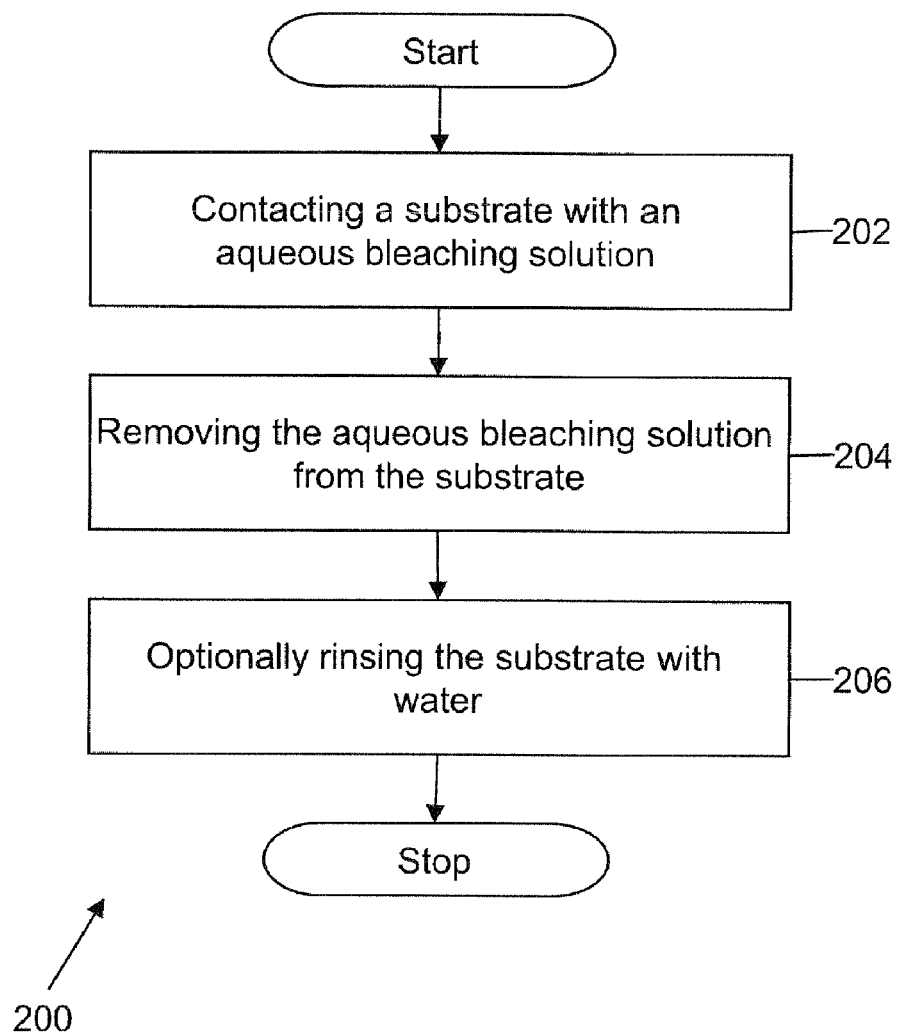
FIG. 2 is a flowchart depicting a method for treating a substrate with the aqueous bleaching solution.

FIG. 2 is a flowchart depicting a method for treating a substrate with the aqueous bleaching solution. At step 202, the substrate is contacted with an aqueous bleaching solution, which may for example, include any one of the inventive aqueous bleaching solutions described herein. At step 204, the aqueous bleaching solution is removed from the substrate. At step 206, the substrate is rinsed with water. In accordance with an embodiment of the invention, step 206 may be optional.

In accordance with an embodiment of the invention, the aqueous bleaching solution may be used for purposes such as to effect bleaching, oxidation of stains, soils and residues, cleaning, whitening, disinfection, odor control, and sanitizing and sterilizing of soft or hard surfaces. Examples of the soft surfaces may include fabrics, textiles, clothing, rugs, and the like. In accordance with an embodiment of the invention, the aqueous bleaching solution may be a substantially dilute solution.

The number of optically functional particles present in the inventive suspended polymer matrix may vary from a substantially low number to a substantially high number, and may be expressed in terms of a weight ratio between the total weight of the one or more copolymers and the total weight of the plurality of optically functional particles, referenced herein as the copolymer-to-particle ratio. In one embodiment, an aqueous bleaching solution may include a substantially high copolymer-to-particle ratio to avoid discoloration or staining of the soft surfaces. In accordance with another embodiment of the invention, the aqueous bleaching solution may include a substantially low copolymer-to-particle ratio to achieve intense color or to provide another optically functional benefit to the solution. In yet another embodiment, a suspended polymer matrix having a low copolymer-to-particle ratio may simply be employed at a low weight percent in addition to the aqueous bleaching solution to provide an optically functional benefit at a low overall suspended polymer matrix concentration. In one embodiment, a high copolymer-to-particle ratio may be employed at a low overall suspended polymer matrix concentration to provide an aqueous bleaching solution with a transparent or translucent appearance owing to the relatively lower number of optically functional particles present.

In accordance with an embodiment of the invention, the copolymer-to-particle weight ratio may be from about 1000:1 to about 10:1, or alternatively from about 500:1 to about 25:1, or yet alternatively from about 100:1 to about 50:1.

Further, the aqueous bleaching solution may be a substantially concentrated solution. The aqueous bleaching solution may be rinsed with water and may be used for purposes that may include, but are not limited to, soaking and pretreating of the soft surfaces in a laundering process. The aqueous bleaching solution may also include one or more additives such as fluorescent whitening agents and brighteners to prevent yellowing of the soft surfaces.

Examples of hard surfaces may include counter tops, toilets, bathroom surfaces, floors, and the like. The aqueous bleaching solution may be a substantially concentrated solution. In accordance with an embodiment of the invention, the aqueous bleaching solution may include a high copolymer-to-bleach ratio for cleaning of the hard surfaces. Further, the aqueous bleaching solution may be optionally rinsed with water.

EXPERIMENTAL

In the following section, experiments have been carried out to demonstrate the improved and retained stability of the aqueous bleaching solution of the invention. In particular, the stability of the suspended polymer matrix with the optically functional particles, in solutions including a source of oxidant has been depicted under typical and accelerated storage conditions. For experimentation purposes, the suspended polymer matrix included the indicated dyes present during copolymerization of the copolymers in a manner as disclosed herein to provide a plurality of optically functional dye particles, and the source of oxidant included sodium hypochlorite. The copolymer-to-particle weight ratio of the polymer matrix materials employed is approximately 40:1, accomplished by polymerization of the indicated copolymer present at about 400 grams per kilogram of solvent in the presence of about 10 g per kilogram of solubilized dye. The copolymer is a 50:50 weight ratio of styrene monomer and acrylic acid monomer randomly copolymerized in the solvent with the solubilized dye present, as described by the methods herein. Following polymerization, solvent was extracted to obtain the polymer matrix incorporating the dye in particulate form. The resulting polymer matrix was then reconstituted into water to form a suspended polymer matrix of the copolymer with the incorporated dye present in the form of a plurality of associated particles retaining their optically functionality within the polymer matrix.

Sodium hypochlorite was selected as a representative embodiment of an aggressive oxidant to show the particularly advantageous properties of the suspended polymer matrix for protecting a plurality of particles from the effects of unwanted aggregation, settling, precipitation and/or degradation by the oxidant present. While various particles, such as pigments, dyes, whitening agents and the like, may exhibit different degrees of susceptibility to the effects of different oxidant materials, it is believed that hypohalous bleaches represent the most aggressive bleaches toward the type of pigments exampled herein when present in aqueous solutions, and therefore serve to particularly demonstrate the advantages of the instant invention. Further, the high concentrations employed provide high ionic strength solutions that are also associated with otherwise detrimental effects on particulates including aggregation and precipitation from aqueous solution. The pigments exampled in the present embodiment mainly include anthroquinone derivatives known to be susceptible to the effects of ionic strength and bleach in solution, and particularly so with regard to hypohalous bleaches such as hypochlorite. In the particular embodiments tested, the suspended polymer matrix utilized dyes that were incorporated during polymerization of monomers of styrene and acrylic acid forming a polystyrene-acrylic acid copolymer. The experiments were conducted for solutions with sodium hypochlorite concentration in the range of 3.5 to 6.1 percent by weight, with the pH of the aqueous bleaching solution in the range of 12.4 to 12.8.

Four different samples of suspended polymer matrixes containing incorporated dyes were tested for stability in the presence of sodium hypochlorite in aqueous solutions, and were found to have very good stability. These pigments selected included pigments 4919, 4920, 4921, and 4922, all available from Clariant. The pigments, although available in an extremely fine particulate form, are not water soluble. The suspended polymer matrix incorporating Pigment 4919 was noted to produce a red violet color, pigment 4920 a royal blue color, pigment 4920 a pale blue color and pigment 4922 a blue green color when formulated into respective aqueous bleaching solutions. Table 1 provides exemplary structures of pigment 4919, pigment 4920, pigment 4921 and pigment 4922. In particular, suspended polymer matrixes of pigment 4919, pigment 4920, pigment 4921 and pigment 4922 as depicted in Table 1 provide a colorimetric profile as a measurable optically functional property provided to the aqueous bleach solution in which they are incorporated. In accordance with various embodiments of the invention, optically functional materials may have different structures that are stable in the aqueous bleaching solution into which suspended polymer matrixes incorporating the material are formulated. In accordance with various embodiments of the invention, optically functional materials may have different structures that are less stable in an aqueous bleaching solution when not incorporated into a suspended polymer matrix.

TABLE 1

Pigments made by incorporating dyes into polystyrene-acrylic acid copolymers

| Pigment | Color | C.I. Name | TSCA Name | Structure |
|---|---|---|---|---|
| 4919 | Red violet | Solvent Violet 59 | 9,10-Anthracenedione, 1,4-diamino-2,3-diphenoxy- | 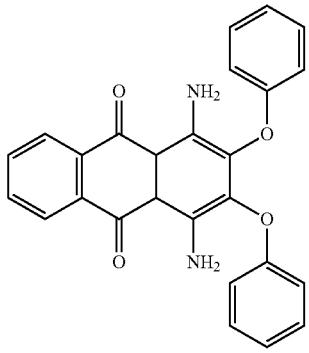 |
| 4920 | Royal blue | Solvent Blue 45 | Proprietary | Proprietary |
| 4921 | Pale blue | Solvent Blue 104 | 9,10-Anthracenedione, 1,4-bis[(2,4,6-trimethyl-phenyl)amino]- | 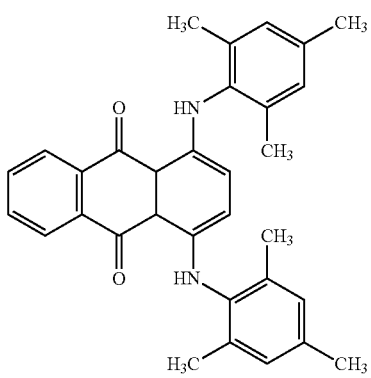 |

TABLE 1-continued

Pigments made by incorporating dyes into polystyrene-acrylic acid copolymers

| Pigment | Color | C.I. Name | TSCA Name | Structure |
|---|---|---|---|---|
| 4922 | Blue green | Solvent Green 3 | 9,10-Anthracenedione, 1,4-bis[(4-methylphenyl)amino]- | (structure) |

Table 2 and Table 3 depict the results of the representative experiments. In particular, Table 2 and Table 3 depict the stability of the four dyes present in the form of a suspended polymer matrix comprising a 50:50 styrene-acrylic acid copolymer incorporating the indicated dyes in particulate form. It may be noted that the color stability has been assessed by measuring the reflectance of the aqueous bleaching solution. The well-accepted L, a, b colorimetric scale is used to measure the appearance and color of the aqueous bleach solutions incorporating the suspended polymer matrix, and to analyze the results following various storage times. Here, "L" indicates the Lightness component, wherein a value of 100 is "pure white" and a value of 0 represents "pure black." Further, "a" indicates red-greenness, and "b" indicates yellow-blueness colorimetric components, respectively, of the color of the aqueous bleaching solution. Delta E provides a measurement of the overall color difference with time, relative to the initial value of the colorimetric components measured immediately following preparation of fresh bleaching solutions, compared to a later value of the same colorimetric components measured under the same conditions. After prolonged storage at elevated temperatures, samples were allowed to equilibrate to room temperature before sampling and colorimetric measurements.

Table 2 includes the results showing the color stability of the four pigments incorporated into a suspended polymer matrix and formulated into an aqueous bleaching solution having the indicated initial concentration of sodium hypochlorite and pH. In particular, the concentration of sodium hypochlorite was about 6.06 percent by weight and the pH was about 12.6. It may be noted that the four colored polymer matrixes are substantially stable at about 120° F. temperature for about 500 hours when incorporated into the suspended polymer matrix, stability being the ability of the suspended polymer matrix to prevent substantial changes in the colorimetric measurement. Without being bound by the theory, it may be apparent to a person skilled in the art that stability at 120° F. temperature for about 500 hours may be equivalent to greater than one year storage stability at room temperature of about 75° F., owing to the thermally accelerated rate of reaction and/or decomposition induced by storage at the elevated temperature.

TABLE 2

Color Stability of Pigments in Sodium Hypochlorite

| Hours at 120° F. | Pigment | wt % Pigment | wt % NaOCl | pH | L | a | b | $E = \sqrt{(a^2 + b^2)}$ | $\Delta E = \sqrt{(\Delta a^2 + \Delta b^2)}$ vs.. control | $\Delta E$, % left | NaOCl Left, % of control |
|---|---|---|---|---|---|---|---|---|---|---|---|
| 0 | 4920 | 1.05 | 6.06 | 12.60 | 14.90 | 4.43 | −11.93 | 12.73 | 19.84 | 100.0% | |
| 16 | 4920 | | | | 15.04 | 3.33 | −10.80 | 11.30 | 18.38 | 92.7% | |
| 40 | 4920 | | | | 15.30 | 2.63 | −9.82 | 10.16 | | | |
| 112 | 4920 | | | | 15.48 | 1.79 | −8.78 | 8.96 | 15.80 | 79.7% | |
| 216 | 4920 | | | | 15.60 | 1.33 | −8.17 | 8.27 | | | |
| 480 | 4920 | | | | 16.32 | 0.96 | −7.58 | 7.64 | 13.25 | 66.8% | 94% |
| 0 | 4919 | 0.99 | 6.06 | 12.60 | 13.79 | 4.59 | −3.30 | 5.65 | 11.91 | 100.0% | |
| 16 | 4919 | | | | 14.30 | 3.60 | −2.50 | 4.38 | 10.70 | 89.8% | |
| 40 | 4919 | | | | 14.69 | 3.35 | −2.29 | 4.06 | | | |
| 112 | 4919 | | | | 14.69 | 2.80 | −1.73 | 3.29 | 9.41 | 79.0% | |
| 216 | 4919 | | | | 14.88 | 2.26 | −1.42 | 2.67 | | | |
| 480 | 4919 | | | | 15.19 | 1.78 | −1.00 | 2.04 | 7.08 | 59.4% | 96% |
| 0 | 4921 | 1.01 | 6.06 | 12.60 | 18.01 | 2.62 | −10.87 | 11.18 | 18.35 | 100.0% | |
| 16 | 4921 | | | | 18.95 | 0.98 | −8.21 | 8.26 | 15.36 | 83.7% | |
| 40 | 4921 | | | | 19.29 | 0.41 | −7.51 | 7.52 | | | |
| 112 | 4921 | | | | 19.52 | 0.19 | −6.90 | 6.90 | 13.70 | 74.6% | |
| 216 | 4921 | | | | 19.82 | −0.21 | −6.26 | 6.26 | | | |
| 480 | 4921 | | | | 20.15 | 0.05 | −4.60 | 4.60 | 10.18 | 55.5% | 92% |

TABLE 2-continued

Color Stability of Pigments in Sodium Hypochlorite

| Hours at 120° F. | Pigment | wt % Pigment | wt % NaOCl | pH | L | a | b | E = $\sqrt{(a^2 + b^2)}$ | $\Delta E = \sqrt{(\Delta a^2 + \Delta b^2)}$ vs. control | $\Delta E$, % left | NaOCl Left, % of control |
|---|---|---|---|---|---|---|---|---|---|---|---|
| 0 | 4922 | 1.09 | 6.06 | 12.60 | 16.51 | −1.12 | −6.15 | 6.26 | 13.22 | 100.0% | |
| 16 | 4922 | | | | 16.62 | −1.12 | −6.09 | 6.20 | 13.07 | 98.8% | |
| 40 | 4922 | | | | 16.58 | −0.92 | −5.62 | 5.70 | | | |
| 112 | 4922 | | | | 17.21 | −0.85 | −5.19 | 5.26 | 11.91 | 90.1% | |
| 216 | 4922 | | | | 17.45 | −1.15 | −4.95 | 5.08 | | | |
| 480 | 4922 | | | | 18.54 | −1.00 | −4.89 | 4.99 | 10.43 | 78.9% | 95% |

Table 3 includes colorimetric results showing the colorimetric stability of pigments 4920 and 4919 incorporated into their respective suspended polymer matrixes and exposed to bleaching solutions of various pH values, wherein the initial concentration of sodium hypochlorite was the same. The calorimetric stability of polymer matrixes incorporating pigments 4920 and 4919 was found to improve when the pH of the aqueous bleaching solution was increased. Test results of fine particulate forms of the pigments not incorporated into a polymer matrix are not included in Table 3, owing to the observation that aqueous suspensions of the pigments in otherwise identical bleaching solutions quickly lost nearly all measurable colorimetric values after several hours of storage owing to the combined effect of precipitation and settling of the pigment from solution, even following relatively mild room temperature storage conditions overnight.

TABLE 3

Color Stability of Pigments in Sodium Hypochlorite

| Hours at 120° F. | Pigment | Wt % Pigment | wt % NaOCl | pH | L | a | b | E = $\sqrt{(a^2 + b^2)}$ |
|---|---|---|---|---|---|---|---|---|
| 0 | 4920 | 1.02 | 3.45 | 12.40 | 15.53 | 5.359 | −13.89 | 14.89 |
| 16 | 4920 | | | | 15.51 | 4.527 | −12.84 | 13.62 |
| 112 | 4920 | | | | 15.83 | 2.776 | −10.8 | 11.15 |
| 184 | 4920 | | | | 15.67 | 2.087 | −9.763 | 9.98 |
| 256 | 4920 | | | | 15.32 | 1.985 | −9.156 | 9.37 |
| 328 | 4920 | | | | 14.91 | 1.776 | −8.509 | 8.69 |
| 592 | 4920 | | | | 14.8 | 1.499 | −7.994 | 8.13 |
| 687 | 4920 | | | | 14.73 | 0.778 | −7.515 | 7.55 |
| 952 | 4920 | | | | 17.37 | −0.6 | −3.021 | 3.08 |
| 1024 | 4920 | | | | 13.24 | 0.106 | −0.082 | 0.13 |
| 0 | 4920 | 1.05 | 3.45 | 12.80 | 15.46 | 5.505 | −14.14 | 15.18 |
| 16 | 4920 | | | | 15.55 | 4.798 | −13.51 | 14.34 |
| 112 | 4920 | | | | 15.61 | 3.803 | −12.05 | 12.64 |
| 184 | 4920 | | | | 15.49 | 3.186 | −11.17 | 11.62 |
| 256 | 4920 | | | | 15.22 | 3.188 | −10.52 | 10.99 |
| 328 | 4920 | | | | 14.84 | 2.371 | −9.784 | 10.07 |
| 592 | 4920 | | | | 14.43 | 2.231 | −9.079 | 9.35 |
| 687 | 4920 | | | | 14.29 | 1.794 | −8.759 | 8.94 |
| 952 | 4920 | | | | 14.11 | 1.462 | −7.918 | 8.05 |
| 1024 | 4920 | | | | 13.78 | 1.412 | −7.714 | 7.84 |
| 0 | 4919 | 1.05 | 3.45 | 12.44 | 14.25 | 5.809 | −4.445 | 7.31 |
| 16 | 4919 | | | | 14.31 | 4.89 | −3.602 | 6.07 |
| 112 | 4919 | | | | 14.46 | 4.197 | −2.776 | 5.03 |
| 184 | 4919 | | | | 14.56 | 3.617 | −2.194 | 4.23 |
| 256 | 4919 | | | | 14.51 | 3.233 | −1.769 | 3.68 |
| 328 | 4919 | | | | 14.36 | 2.888 | −1.448 | 3.23 |
| 592 | 4919 | | | | 14.87 | 1.95 | −0.698 | 2.07 |
| 687 | 4919 | | | | 14.41 | 1.698 | −0.457 | 1.76 |
| 952 | 4919 | | | | 14.97 | 0.85 | −0.158 | 0.86 |
| 1024 | 4919 | | | | 14.3 | 0.966 | −0.104 | 0.97 |
| 0 | 4919 | 1.04 | 3.45 | 12.80 | 14.47 | 5.643 | −4.395 | 7.15 |
| 16 | 4919 | | | | 14.37 | 5.051 | −3.997 | 6.44 |
| 112 | 4919 | | | | 14.54 | 4.672 | −3.385 | 5.77 |
| 184 | 4919 | | | | 14.54 | 4.039 | −2.905 | 4.98 |
| 256 | 4919 | | | | 14.24 | 3.735 | −2.599 | 4.55 |
| 328 | 4919 | | | | 14.18 | 3.312 | −2.342 | 4.06 |
| 592 | 4919 | | | | 14.34 | 2.757 | −1.734 | 3.26 |
| 687 | 4919 | | | | 13.93 | 2.715 | −1.496 | 3.10 |
| 952 | 4919 | | | | 14.7 | 1.999 | −1.153 | 2.31 |
| 1024 | 4919 | | | | 14.12 | 2.079 | −0.971 | 2.29 |

Stored in 4 oz. wide mouth polypropylene jars, reflectance measured through a lid with a ⅞ inch diameter hole.

Figure 3:
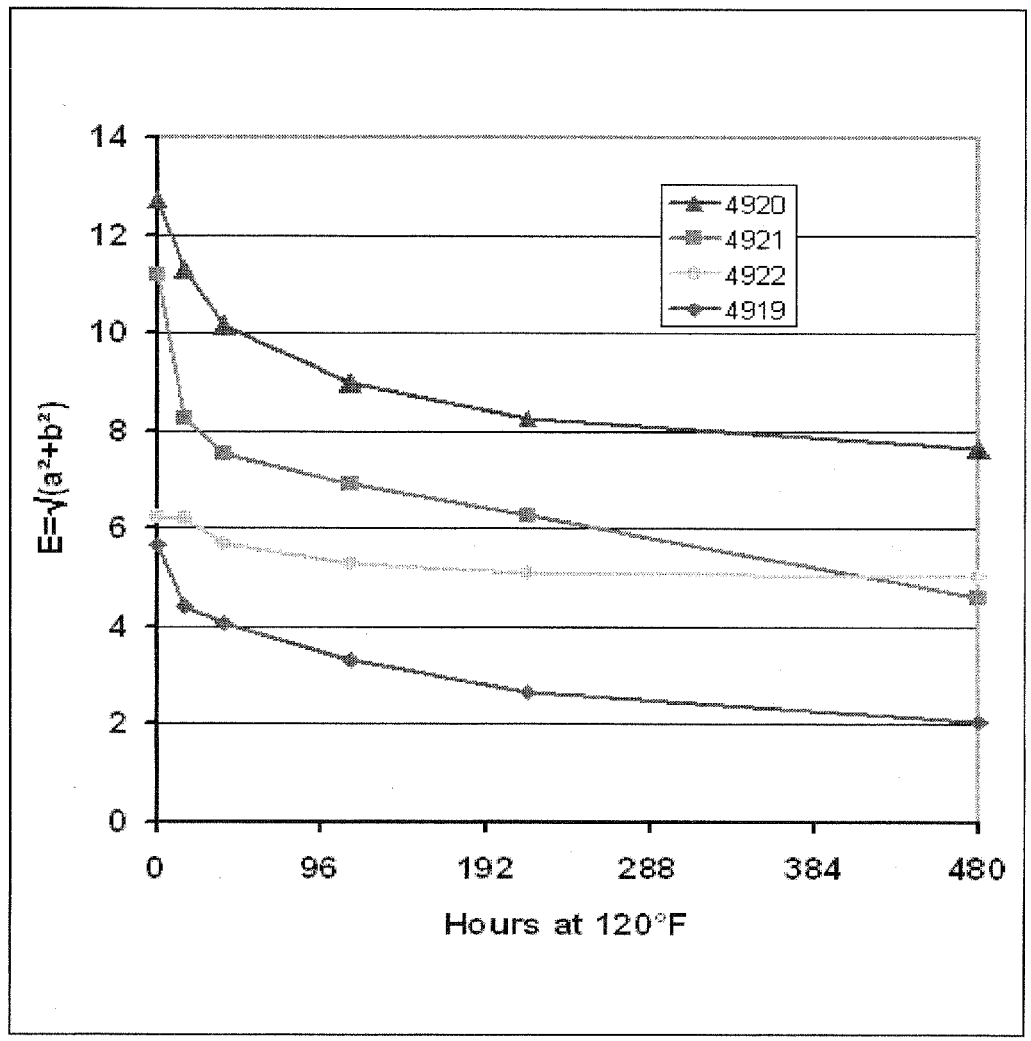
FIG. 3 is a graph representing the results of experiments conducted to test the stability of an aqueous bleaching solution.

FIG. 3 is a graphical representation of the results of the experiments explained in conjunction with Table 2. FIG. 3 includes a plot of the parameter E vs. the time over which the experiments were conducted. The stability of the four pigments incorporated into suspended polymer matrixes in solutions including about 6.06 percent sodium hypochlorite at a pH of about 12.6 has been depicted. FIG. 3 shows that the aqueous bleaching solutions used in the experiments form substantially stable dispersions of the suspended polymer matrix with incorporated dye particles for at least 480 hours at a temperature of 120° F.

Figure 4:
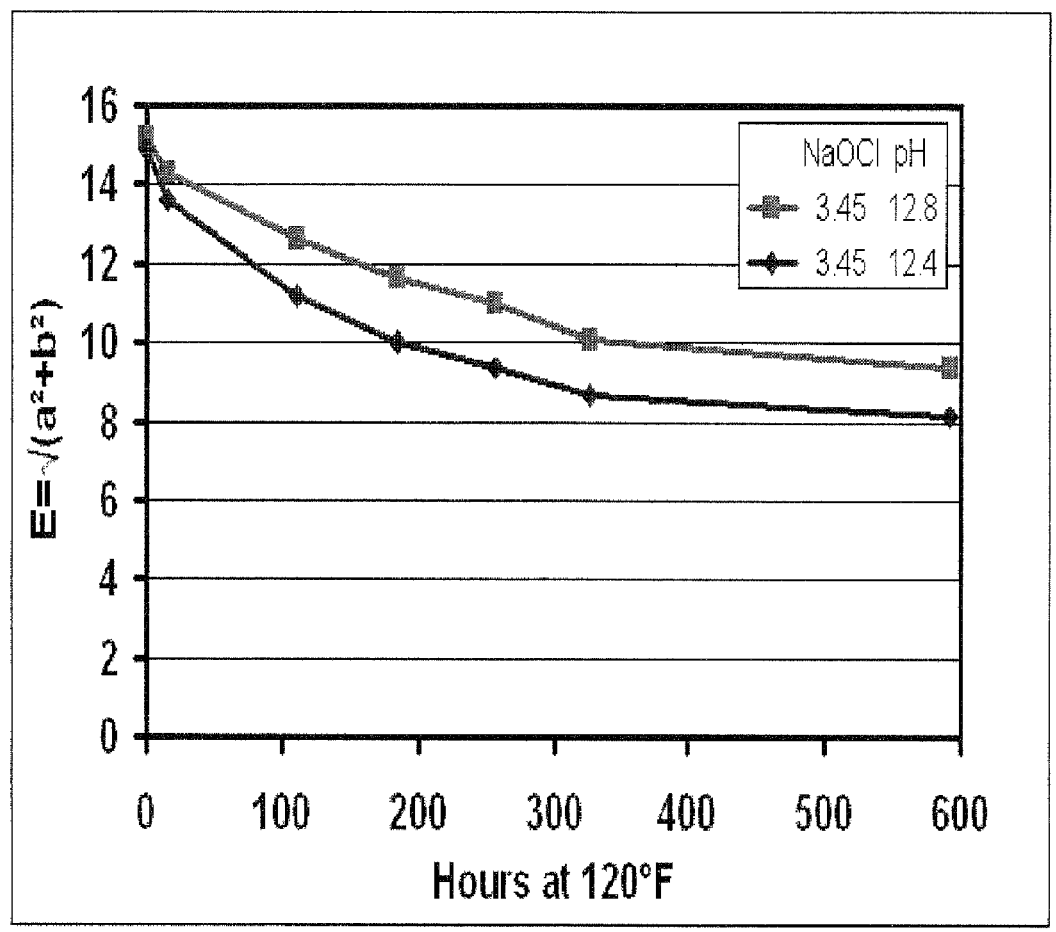
FIG. 4 is a graph of a stability parameter vs. time for an aqueous bleaching solution containing a pigment.

FIG. 4 is a graph of the stability parameter E vs. time for an aqueous bleaching solution containing pigment 4920 incorporated into a 50:50 styrene:acrylic acid copolymer matrix. FIG. 4 graphically represents the results depicted in Table 2 and Table 3. Line graphs have been drawn for three different combinations of the concentration of sodium hypochlorite and the pH of the aqueous bleaching solution. As may be evident from FIG. 4, the invention renders substantial stability to the overall color of the aqueous bleaching solution where the optically functional particles are present in the form of a suspended polymer matrix. It may be noted that the color parameters of the suspended polymer matrix remains substantially stable for at least about 600 hours at 120° F.

Figure 5:
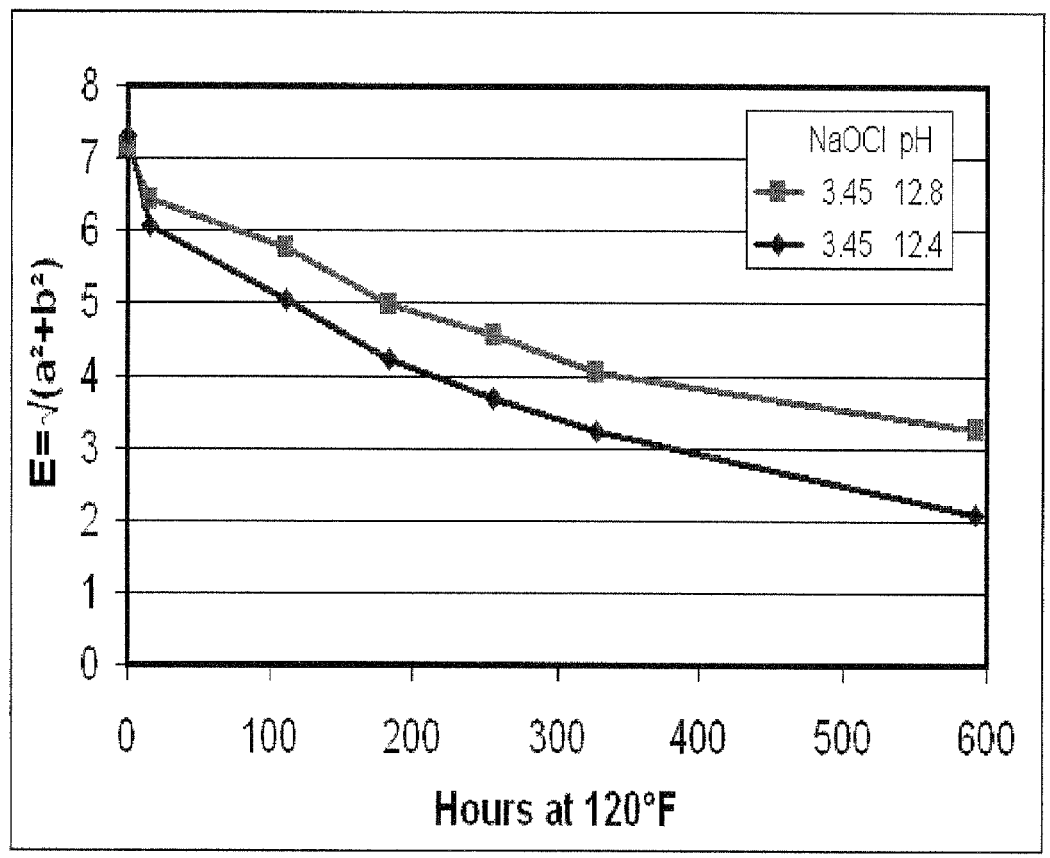
FIG. 5 is a graph of a stability parameter vs. time for an aqueous bleaching solution containing another pigment.

FIG. 5 is a graph of the stability parameter E vs. time for an aqueous bleaching solution containing pigment 4919 incorporated into a 50:50 styrene:acrylic acid copolymer matrix. Line graphs have been drawn for three different combinations of the concentration of sodium hypochlorite and the pH of the aqueous bleaching solution. As may be evident from FIG. 5, the invention renders substantial stability to the color of the aqueous bleaching solution. It is noted that the color parameters of the suspended polymer matrix remains substantially stable for at least about 600 hours at 120° F.

In light of the foregoing discussion, it may be concluded that the invention provides aqueous bleaching compositions having optically functional particles present in the form of a suspended polymer matrix that exhibit improved stability in the presence of a source of oxidant without the need for employing the use of conventional suspending agents, dispersing agents, thickening agents, or the like.

Without departing from the spirit and scope of this invention, one with ordinary skill can make various changes and modifications to the invention to adapt it to various usages and conditions. As such, these changes and modifications are properly, equitably, and intended to be, within the full range of equivalence of the following claims.

We claim:

1. A method of treating a substrate comprising the steps of:
   i. contacting a substrate with an aqueous bleaching solution comprising:
      a source of oxidant; and
      a suspended polymer matrix, the suspended polymer matrix comprising:
         one or more copolymers; and
         a plurality of optically functional particles, comprising visibly colored particles exhibiting at least one optical absorbance band providing a human perceivable color and associated with the one or more copolymers,
      wherein the suspended polymer matrix forms a stable dispersion in the aqueous bleaching solution;
      wherein said one or more copolymers comprises at least one copolymer formed by polymerizing one or more hydrophobic monomers in combination with one or more hydrophilic monomers in the presence of the plurality of optically functional particles to form a single random suspended polymer matrix in the presence of the optically functional material dissolved in an organic solvent;
   ii. removing said aqueous bleaching solution from said substrate; and wherein said suspended polymer matrix provides an optical stability to said aqueous bleaching solution exhibiting less than 20 delta E units change after storage at 120° F. for 480 hours.

2. The method according to claim 1, further comprising the step of rinsing said substrate with water.

3. The method according to claim 1, wherein said substrate comprises a surface selected from a hard surface, a soft surface, and combinations thereof.

4. The method according to claim 3, wherein said hard surface comprises a household surface selected from the group consisting of countertops, toilets, bathroom surfaces, floor, utensils, ceramic surfaces, tile, grout, glass surfaces, metal surfaces, wooden surfaces, and combinations thereof.

5. The method according to claim 3, wherein said soft surface comprises a household material selected from the group consisting of fabrics, textiles, clothing, rugs, and combinations thereof.

6. The method according to claim 1, wherein said source of oxidant comprises a source of active halogen selected from the group consisting of hypohalite ion, hypohalous acid, halogen dioxide, dihalogen oxide, and combinations thereof, wherein said halogen is selected from the group consisting of chlorine, bromine, iodine, and combinations thereof.

7. The method according to claim 1, wherein the source of active halogen comprises sodium hypochlorite; wherein the concentration said sodium hypochlorite in the aqueous bleaching solution is between 0.0001% to 20% by weight.

8. The method according to claim 1, wherein at least one of said hydrophobic monomers is a styrene monomer, and wherein at least one of said hydrophilic monomers is a polymerizable monomer having at least one polymerizable ethylene group and at least one carboxylic acid group.

9. The aqueous bleaching solution according to claim 1, wherein said suspended polymer matrix comprises a plurality of optically functional particles formed by association of a non-aqueous solution of dissolved optically functional materials with said one or more copolymers during polymerization of said one or more copolymers.

10. The method according to claim 1, wherein said suspended polymer matrix comprises a plurality of optically functional particles formed by extraction of said non-aqueous solution following polymerization of said one or more copolymers.

11. The method according to claim 1, wherein the copolymer-to-particle ratio is between 1000:1 to 10:1.

12. The method according to claim 1, wherein the average size of the plurality of optically functional particles is from 5 nanometers to 100 microns.

13. The method according to claim 1, wherein said suspended polymer matrix further comprises at least one non-optically functional particle.

14. The method according to claim 1, wherein said plurality of optically functional particles comprise an anthraquinone or derivative thereof.

15. The method according to claim 1, wherein said suspended polymer matrix provides an optical stability to said aqueous bleaching solution exhibiting less than 20 delta E units change after storage at 120° F. for 480 hours.

16. The method according to claim 1, further comprising one or more cleaning additives, wherein said cleaning additives are selected from the group consisting of surface-active agents, anti-corrosion agents, pacifying agents, surfactants, builders, pH control agents, pH-buffering components, chelants, sequestrants, stabilizing agents, fillers, binding agents, anti-dusting agents, dispersing agents, co-surfactants, aesthetic adjuncts such as fragrances, coloring agents, dyes, whiteners, solvents and chelating agents, and combinations thereof.

17. The method according to claim 1, wherein the viscosity of the aqueous bleaching solution measured before and after addition of the suspended polymer matrix differs by less than 10 milliPascal seconds.

* * * * *